Feb. 6, 1940.  C. H. TIGNER  2,189,690
COTTON GIN
Filed Nov. 9, 1938  2 Sheets-Sheet 2
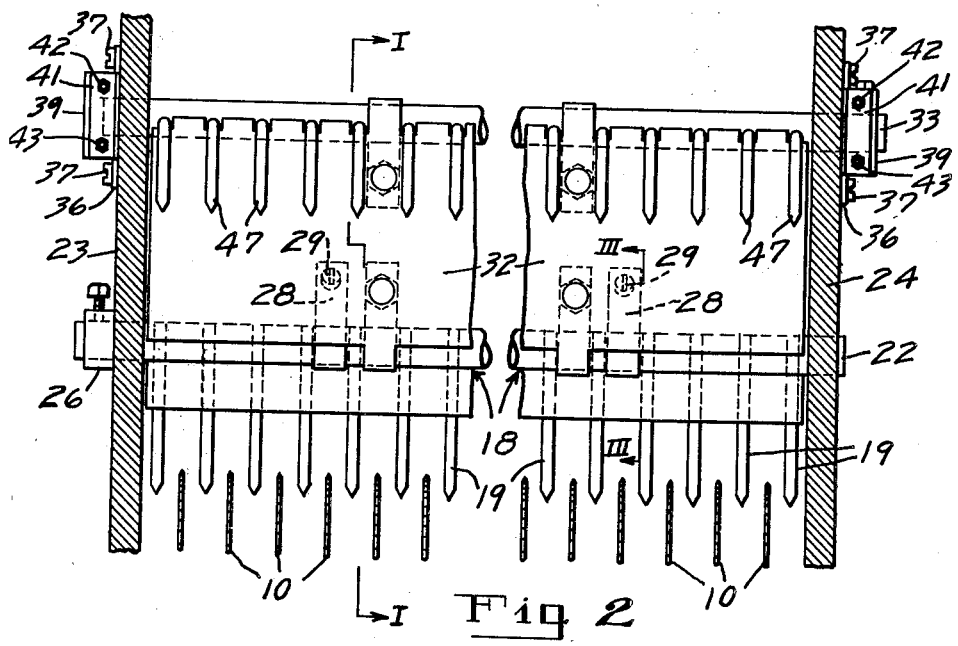
Fig. 2
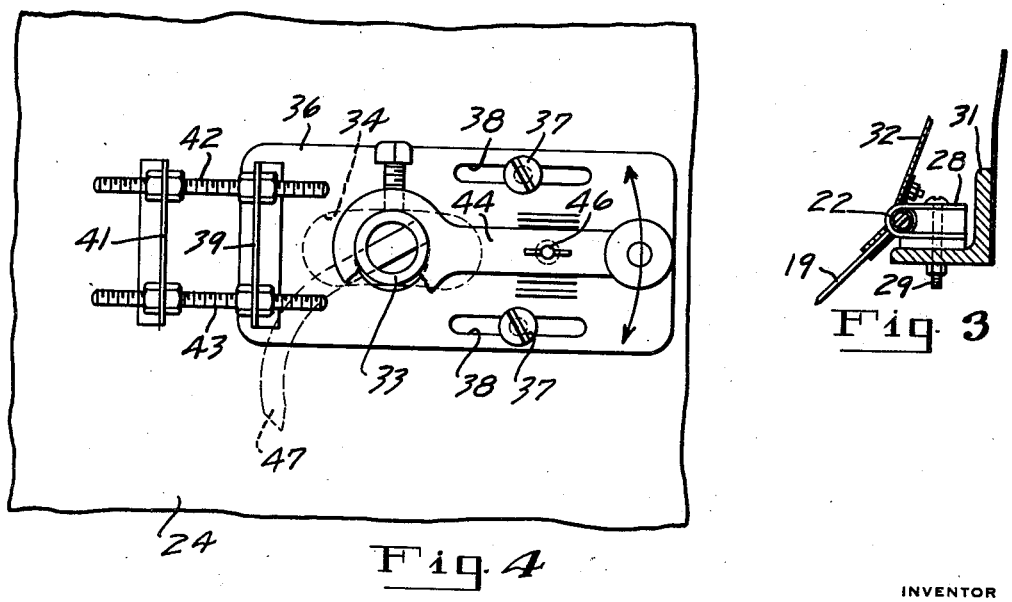
Fig. 4
Fig. 3
INVENTOR
CLARENCE H. TIGNER
BY
Johnston & Jennings
ATTORNEYS Patented Feb. 6, 1940

2,189,690

UNITED STATES PATENT OFFICE 2,189,690

COTTON GIN

Clarence H. Tigner, Columbus, Ga., assignor to Lummus Cotton Gin Company, a corporation of Georgia Application November 9, 1938, Serial No. 239,661

21 Claims. (Cl. 19—55)

This invention relates to cotton gins, and has for its object the provision of a gin which shall have a greater capacity, provide a better sample, and effect a better cleaning of the cotton seeds than gins heretofore in common use.

A further object of my invention is to provide an improved roll box in a cotton gin which shall include means for controlling the density of the roll, its angle of approach to the saws, and the rate of removal of seeds therefrom in the ginning operation.

A still further object of my invention is to provide an improved roll box in a cotton gin which shall include a means for a quick relief of pressure at the point in the zone of greatest density of the roll whereby seeds stripped of their lint are thrown out to the outer perimeter of the roll.

Another object of my invention is to provide an improved roll box embodying an auxiliary seed comb so disposed as to comb the ginned seeds out of the roll in advance of its approach to the ginning ribs, whereby they are more readily separated from the roll.

Another object of my invention is to provide an improved cotton gin embodying a roll box which shall include means for adjustably controlling the rate of removal of seeds from the roll and the density and relation of the roll to the saws whereby to adapt the gin to various grades of cotton and various lengths of staple and obtain from each the best possible sample and clean seeds.

In cotton gins, as is well known, seed cotton is fed either directly into that portion of the gin breast comprising the roll box, or into an outer breast where it is first stripped of its hulls and the seed cotton pulled between huller ribs into the roll box.

In the roll box are a series of saws, referred to as a saw cylinder, passing between ginning ribs. The ginning ribs fit sufficiently close to the saws to prevent the seed from passing through but allow the lint to remain on the saw teeth and be pulled between the ribs. After the lint has been separated from the seed it is removed from the saws by some suitable means, such as by revolving brush or a blast of air.

In a huller gin, there is a wide space between the hulling ribs at the top end, where the saw teeth pass, to allow for locks of seed cotton to be pulled into the roll box, but at the same time to strip off the hulls.

The zone of greatest density in the roll is created at and above the point where the saw teeth pull the lint cotton through the ginning ribs, forcing the mass of ginned and unginned seed and cotton in an upward direction along the ribs, and beyond against the upper rear curved portion of the roll box. This continuous action of the saw on the cotton develops the roll and causes it to revolve in the direction opposite to the saw cylinder. Where the saw cylinder is rotating at a speed of from 600 to 650 R. P. M., the roll of cotton in the roll box rotates at about 100 to 120 R. P. M.

Ginned seeds are allowed to fall out of the roll at the bottom in front of the ginning ribs, and the only influence on the rate of removal of seeds in gins as heretofore known to me has been the provision of a comb with teeth extending between the saws of the saw cylinder. The angular position of this comb is adjustable to permit more or less seeds to fall through, but no means have been provided to insure that the seeds would be removed from the roll as soon as they were stripped of their lint. It will be apparent that for a gin to have the maximum capacity, the seeds should be removed from the roll as soon as they are stripped of their lint. It will also be apparent that for the maximum of efficiency, the seeds should be properly stripped before being discharged.

In ginning long staple cotton, it is particularly desirable that the seeds be discharged as soon as they are stripped of their lint, else the sample is rough and there are short twisted portions of fiber, or "fish hooks", found in the lint, which are thrown out by the cards at the cotton mill and wasted. Such a sample is always given a lower grade and brings a lower price than properly ginned cotton. When ginning short staple cotton, the seeds may be more thoroughly cleaned without spoiling the sample and consequently the seeds may be held longer in the roll box. The variety of cotton raised in one locality will be found to have relatively large seeds, in another locality small seeds, and for best results to be obtained they should have different treatment in ginning.

Heretofore cotton gins have been constructed to provide operating conditions which were necessarily a compromise between those most desirable for the different kinds and conditions of cotton encountered, and none, so far as I am aware, were adapted to effect the most efficient ginning of all kinds of cotton. It is accordingly one of the principal objects of my invention to provide a cotton gin which shall be so constructed as to be adjustable for the maximum of capacity and efficiency with whatever kind of cotton encountered.

I have discovered that the rate of discharge of ginned seeds from the roll box may be greatly increased by providing means in advance of the discharge point for releasing the seeds from the roll and causing them to assume a position on the outer perimeter of the roll in advance of their discharge point. Also the discharge of the seeds and the efficiency in ginning is aided by controlling the density of the roll in accordance with the kind of cotton being ginned.

In accomplishing the foregoing, I construct the roll box with a decided set back or off-set at the top of the ginning ribs opposite the zone of greatest density in the roll, so that the pressure of the roll is considerably relieved immediately after it passes the ginning ribs in its rotation.

This release of pressure causes the cleaned seed within the roll near the surface to be thrown to the outer periphery of the roll where they are in position to be removed. In advance of the regular comb in the roll box, I provide an auxiliary comb against which the roll rotates and which acts to break up the cohesion of the roll so that the ginned seeds fall out of the roll and pass more readily through the main seed comb. Also the auxiliary seed comb provides a finer adjustment with respect to the roll than does the main seed comb. Preferably the auxiliary comb is positioned in the roll box at a point near the zone of least density of the roll, and the teeth of the comb are preferably so shaped as to avoid a twisting of the cotton fiber. In addition, I mount the auxiliary comb on a carrier in the form of a plate which forms a part of the front of the roll box and is adjustable inwardly and outwardly of the roll box whereby to adjust the size of the box and the density of the roll. By the means just described, I am enabled to remove the cotton seeds as fast as they are stripped of their lint, and to adapt the gin to operate with maximum efficiency with all kinds of motton. In numerous tests I have found that a gin constructed in accordance with my invention has a capacity of from 30% to 50% more than gins with which I have heretofore been familiar. This increase in capacity, in a gin assembly comprising four eighty saw gin stands, amounts to around two bales per hour.

Apparatus embodying features of my invention is illustrated in the accompanying drawings forming a part of this application, in which Fig. 1 is a fragmentary sectional view of a gin embodying my invention looking in the direction of the arrows I—I of Fig. 2;

Fig. 2 is a sectional view taken along the line II—II of Fig. 1;

Fig. 3 is a detail sectional view taken along the line III—III of Fig. 2;

Fig. 4 is a detail end view showing the means for adjusting the auxiliary comb carrier and the position of the auxiliary comb; and Fig. 5 is a detail view showing the means for adjusting the position of the main comb.

Figure 1:
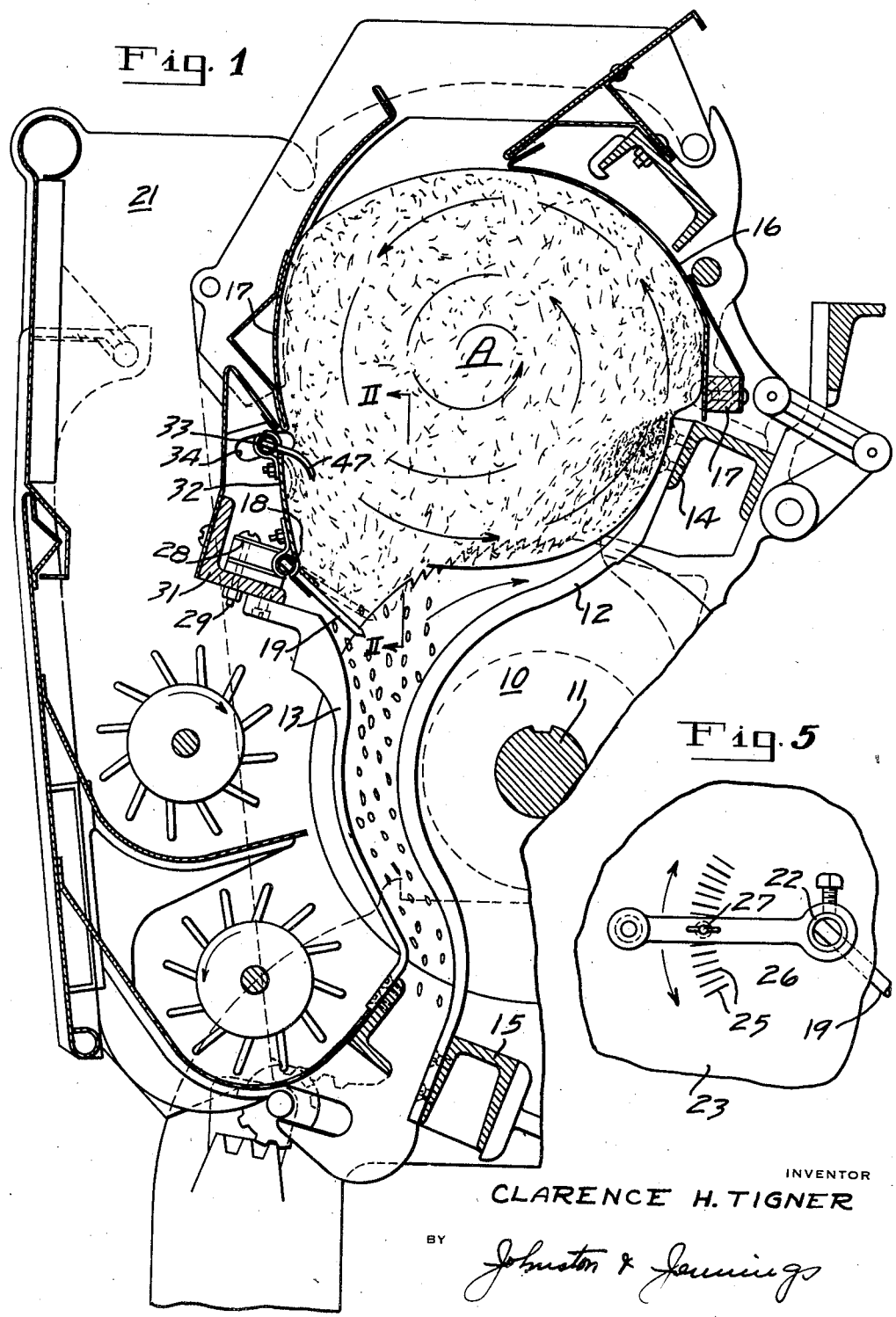

Referring to the drawings for a better understanding of my invention, I show a saw cylinder 10 of the usual construction comprising a plurality of saws mounted upon a rotary shaft 11, the saws being mounted to rotate between the usual set of ginning ribs or grate fall 12 and hulling ribs 13. The ginning ribs are secured at top and bottom to rib rails 14 and 15 respectively. The roll box A of the gin is defined by the great fall or set of ginning ribs 12, by a curved pressure plate 16 above and beyond the grate fall and by a curved front plate 17. The usual seed comb 18 is positioned in the lower part of the roll box and is provided with teeth 19 which extend between the saws 10. As shown, the gin may also comprise an outer or huller breast or front 21 into which cotton containing hulls may be fed to have the hulls removed therefrom by action well understood before the cotton is drawn into the roll box A. Also, the cotton may be fed, if desired, directly into the upper part of the roll box A.

By whatever means the cotton is fed into the roll box A, it is acted upon by the saws 10 to strip the lint from the seeds and the ribs 12 are so closely spaced that the seeds may not pass between them but are carried around with the roll of seed cotton in the roll box A. The lint is removed from the saws at the rear of the gin by any suitable means, not shown, all of which is well understood in the art.

It will be seen, by reference to Fig. 1, that the action of the saw cylinder on the roll is to force it toward the rear of the roll box A and against the pressure plate 16, so that the zone of greatest density of the roll is in that area adjacent the upper end of the grate fall 12 where the saws are just leaving the roll. The least dense, or loosest portion of the roll, is necessarily adjacent the seed comb 19 where the lint is just being engaged by the saws to strip it from the seeds. The action of the saw cylinder on the roll at this point is to disrupt and break the roll, allowing the ginned seeds to fall out.

As heretofore pointed out, I have discovered that by suddenly relieving the pressure on the roll at a point in the zone of greatest density, I am enabled to remove the ginned seeds more rapidly from the roll. I accordingly set the pressure plate 16, which forms the upper rear wall of the roll box, at its lower end 17 adjacent the rib rail 14, back a sufficient distance from the front surface of the ribs to allow the roll to expand suddenly as it passes the grate fall, and thus relieve the pressure on it somewhat, whereby the ginned seeds tend to move to the outer periphery of the roll. This set back may be as much as three-fourths inch to one inch with twelve inch saws. As shown in Fig. 1 the set back is substantially equal to the thickness of the ribs 12 at their upper ends.

The seed comb 18, as may be seen in Fig. 2, is mounted on a shaft 22 which extends through the ends 23 and 24 of the gin. The individual teeth 19 of the comb, as may also be seen by reference to Fig. 2, extend between the saws 10 of the saw cylinder. The rate at which the seeds are allowed to fall from the roll is determined by the angular position of the comb 19. With the teeth raised upwardly to the higher dotted position shown in Fig. 1, the seeds are caused to travel with the roll and remain in the roll box longer than when the teeth are at the lower full line position. The position of the teeth is regulated by means of a handle 26 on the end of the shaft 22, which may be adjusted to the desired position, as shown in Fig. 5, by means of a quadrant 25 and a set screw 27. The shaft 22 is also supported at intervals across the gin stand by means of clips 28 secured by means of bolts 29 to the upper huller rib rail 31, shown particularly in Fig. 3.

Pivotally mounted on the shaft 22 is a plate 32 which defines the lower front wall of the roll box A. The plate 32 has mounted along its upper edge an auxiliary comb shaft 33 which extends through slots 34 in the heads 23 and 24 of the gin, and through plates 36 slidably secured to the heads 24, as shown in Fig. 4, the shaft 33 fitting snugly in holes provided for that purpose in the plates and the plates being held in position by means of set screws 37 passing through slotted holes 38. At one end of each of the plates is a flange 39 which is opposite a flange 41 carried by the head of the gin. Adjusting bolts 42 and 43 pass through the respective flanges to adjust the shaft 33 and the plate 32 inwardly and outwardly of the roll box and thereby control the density of the roll. The auxiliary comb shaft 33 may be adjusted angularly by means of a handle 44 and set screw 46 so that the individual teeth 47 of the auxiliary comb may be caused to assume a position such as the full line position shown in Fig. 1 to engage the roll and loosen the seeds therein or assume the dotted line position shown, out of the way of the roll.

As shown in Fig. 2, relative to the direction of travel of the roll, the individual teeth 47 of the auxiliary comb are preferably directly above, or in line with, the corresponding teeth of the main seed comb 19. I have found that this is very important in removing the seed and loosening up the roll. Also as shown in Fig. 1, the individual teeth 47 of the auxiliary comb are preferably curved downwardly. I have found this to be important in that it prevents twisting of the fiber and the forming of so-called "fish hooks" in the fiber in ginning.

From the foregoing description, the operation of my improved gin will be readily understood. As the cotton enters the roll box A, it is carried around either by the roll, if fed in from the top, or by the saws, if fed in from the huller front 21, and the saws engage the lint to pull it from the seed, effecting rotation of the roll in the box. In Fig. 1 the denser portion of the roll is indicated by the denser stippling of the drawing, and it will be noted that the zone of greatest density is at the upper end of the ribs 12 where the saws leave the roll. By offsetting the rear wall of the roll box with reference to the rib rail 14, I provide a means whereby the pressure is suddenly relieved in the zone of greatest density, allowing the ginned seeds to move to the outer perimeter of the roll. The zone of least density in the roll is just in advance of the point where the roll is first engaged by the saws 10, at which point it is opened up and the seeds are allowed to fall out ahead of the ribs 12, as seen in Fig. 1. In this zone of least density of the roll, the auxiliary comb 47 operates to comb the seeds out of the roll.

The setting of the lower plate 32 and the auxiliary comb 47 will depend upon the nature of the cotton being ginned. With long staple cotton, in order to obtain the best sample, it is desirable that the seeds be removed as soon as the long fibers are stripped therefrom, and consequently the roll in the roll box is preferably "soft", or less dense than with short staple cotton. Under such conditions, the upper end of the plate 32 would be moved inwardly to direct the ginned seeds downwardly so that they would be discharged quicker. Moving the plate 32 outwardly at the top changes the angle of approach of the roll to the saws, flattening it, and causing the seed to stay in longer. Raising the auxiliary comb 47 increases the rate at which seeds are removed from the roll, and consequently the rate of ginning. The setting of the teeth will also depend upon the nature of the cotton being ginned. As a general rule, in ginning short staple cotton, more of the lint is removed from the seeds and the seeds are carried around the roll longer. Consequently the setting of the plate 32 and the auxiliary comb teeth 47 would be for a denser roll than with long staple cotton. With whatever kind of cotton being ginned, my improved gin may be set to provide the maximum of capacity coupled with maximum efficiency.

From the foregoing it will be apparent that I have devised an improved cotton gin having an increased capacity, better ginning efficiency, and capable of providing a better sample than gins heretofore in common use.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:

1. In a cotton gin, a roll box including a grate fall and a saw cylinder with a main seed comb with teeth cooperating with the saws to regulate the discharge of ginned seeds, an auxiliary seed comb in the roll box in advance of the main seed comb with respect to the movement of the roll and mounted for radial and angular adjustment with respect to the roll, and teeth on the auxiliary comb adapted to engage the roll to disengage the ginned seeds therefrom.

2. In a cotton gin, a roll box including a grate fall and a saw cylinder with a main seed comb with teeth cooperating with the saws to regulate the discharge of ginned seeds, an auxiliary seed comb in the roll box in advance of the main seed comb with respect to the movement of the roll, teeth on the auxiliary comb adapted to engage the roll to disengage the ginned seeds therefrom, means to adjust the position of the auxiliary comb angularly with respect to the roll, and other means to adjust the position of the auxiliary comb radially of the roll.

3. In a cotton gin, a roll box including a grate fall and a saw cylinder with a main seed comb with teeth cooperating with the saws to regulate the discharge of ginned seeds, an auxiliary seed comb in the roll box in advance of the main seed comb with respect to the movement of the roll, and downwardly curved teeth on the auxiliary comb adapted to engage the roll to disengage the ginned seeds therefrom; and means to adjust the position of said auxiliary comb radially and angularly with respect to the roll.

4. In a cotton gin, a roll box embodying a grate fall with a cooperating saw cylinder in the lower portion, a main seed comb cooperating with the saw cylinder to discharge ginned seeds, a wall pivoted along its bottom edge defining the lower front of the roll box, and an auxiliary comb pivotally mounted along the upper edge of the lower front wall.

5. In a cotton gin, a roll box embodying a grate fall with a cooperating saw cylinder in the lower portion, a main seed comb cooperating with the saw cylinder to discharge ginned seeds, a wall pivoted along its bottom edge defining the lower front of the roll box, an auxiliary comb pivotally mounted along the upper edge of the lower front wall, and means to adjust the position of the lower front wall and the auxiliary seed comb.

6. In a cotton gin, a roll box embodying a grate fall with a cooperating saw cylinder in the lower portion, a main seed comb cooperating with the saw cylinder to discharge ginned seeds, a wall pivoted along its bottom edge defining the lower front of the roll box, an auxiliary comb pivotally mounted along the upper edge of the lower front wall, means to adjust the position of the lower front wall and the auxiliary seed comb and having downwardly curved teeth adapted to engage the roll in the roll box to loosen and disengage the seeds therefrom, means to adjust the position of the lower front wall, and other means to adjust angularly the position of the auxiliary comb.

7. In a cotton gin, a roll box embodying a grate fall with a cooperating saw cylinder in the lower portion, a main seed comb cooperating with the saw cylinder to discharge ginned seeds, a wall pivoted along its bottom edge defining the lower front of the roll box, an auxiliary comb pivotally mounted along the upper edge of the lower front wall, means to adjust the position of the lower front wall and the auxiliary seed comb and having downwardly curved teeth adapted to engage the roll in the roll box to loosen and disengage the seeds therefrom, said teeth being positioned directly in advance of corresponding teeth on the main seed comb with respect to the direction of movement of the roll, and means to adjust the position of the lower wall and the auxiliary seed comb.

8. In a cotton gin, walls defining a roll box, a saw cylinder in the roll box, a roll of cotton in the roll box rotating by action of the saw cylinder, means in one wall of the roll box opposed to the zone of greatest density of the roll for relieving pressure on the roll, a comb associated with another wall of the roll box opposed to the zone of least density of the roll for removing ginned seeds from the roll, and means to adjust the position of the comb radially and angularly with respect to the roll.

9. In a cotton gin, walls defining a roll box, a saw cylinder in the roll box, a roll of cotton in the roll box rotating by action of the saw cylinder, means in one wall of the roll box opposed to the zone of greatest density of the roll for relieving pressure on the roll, a comb associated with another wall of the roll box opposed to the zone of least density of the roll for removing ginned seeds from the roll, means to adjust the position of the comb radially and angularly with respect to the roll, and a main seed comb cooperating with the saw cylinder to control the rate of discharge of ginned seeds from the gin.

10. In a cotton gin, a saw cylinder comprising a plurality of spaced saws mounted on a common shaft, walls defining a roll box into which the saws project, a sharply defined offset formed in one wall of said roll box against which the roll in the roll box in its zone of greatest density is forced by the rotation of said saws, a main adjustable seed comb, a shaft therefor, an upwardly extending plate forming a part of said roll box wall and pivoted at its lower edge around the main seed comb shaft, an auxiliary seed comb pivotally connected to the upper edge of said plate, and means to adjust and rigidly hold both of said seed combs in different angles of projection into said roll box.

11. In a cotton gin, a saw cylinder comprising a plurality of spaced saws mounted on a common shaft, walls defining a roll box into which the saws project, a sharply defined offset formed in one wall of said roll box against which the roll in the roll box in its area of greatest density is forced by the rotation of said saws, a main adjustable seed comb, a shaft therefor, an upwardly extending plate forming a part of said roll box wall and pivoted at its lower edge around the main seed comb shaft, an auxiliary seed comb adjustably connected to the upper edge of said pivoted plate, means to vary the position of said plate inwardly and outwardly of the roll box, and means to adjust angularly and rigidly hold both of said seed combs in adjusted position.

12. In a cotton gin, a saw cylinder comprising a plurality of spaced saws mounted on a common shaft, walls defining a roll box into which the saws project, a sharply defined offset formed in one wall of said roll box against which the roll in the roll box in its zone of greatest density is forced by the rotation of said saws, a main adjustable seed comb, a shaft therefor, an upwardly extending plate forming a part of said roll box wall and pivoted at its lower end around the main seed comb shaft, an auxiliary seed comb adjustably connected to the upper edge of said pivoted plate, the individual fingers of which are in vertical alignment with those of the main seed comb, and means to adjust angularly and rigidly hold both of said seed combs in adjusted position.

13. In a cotton gin including a roll box having a grate fall and a saw cylinder, and a main seed comb with teeth cooperating with the saws to regulate the discharge of ginned seeds, an auxiliary seed comb in the roll box in advance of the main seed comb with respect to the movement of the roll, teeth on the auxiliary comb projecting radially inward of and adapted to penetrate the roll in the zone where it is being opened up by the action of the saw cylinder thereon to disengage the ginned seeds therefrom, and means to adjust the position of the auxiliary comb angularly with respect to the roll.

14. In a cotton gin, in combination with the roll box with its roll of cotton, the main seed comb and the saw cylinder, an auxiliary seed comb disposed in advance of the main seed comb in the direction of rotation of the roll, and comprising teeth projecting toward the interior of the roll to penetrate and agitate the under portion of the roll at a point where it commences to be loosened up by the action of the saw cylinder thereon.

15. In a cotton gin, in combination with the roll box with its roll of cotton, the main seed comb and the saw cylinder, an auxiliary seed comb mounted in the lower front wall of the roll box above the main seed comb and having teeth penetrating into the roll at the point where it is being opened up by the action of the saw cylinder thereon to comb the ginned seeds out of the roll.

16. In a cotton gin, in combination with the roll box with its roll of cotton, the main seed comb and the saw cylinder, an auxiliary seed comb having teeth penetrating substantially into the roll adjacent the lower front wall of the roll box above the main seed comb in the zone of disruptive influence of the saw cylinder to comb the ginned seeds out of the roll.

17. In a cotton gin embodying a roll box, a saw cylinder in the lower part of the roll box, gin ribs cooperating with the saw cylinder to separate the cotton from its seed, and an upper rib rail to which the upper ends of the ribs are attached, a wall adjacent and above the upper rib rail defining the upper rear wall of the roll box, the lower edge of the said wall being offset substantially equal to the thickness of the ribs at their upper ends rearwardly of the upper rib rail to effect a sudden relief of surface pressure on the roll in its zone of greatest density to cause ginned seeds therein to move near the surface of the roll.

18. In a cotton gin, a saw cylinder, gin ribs cooperating with the saw cylinder to strip the seed from the cotton, an upper rib rail to which the upper ends of the gin ribs are joined, walls defining a roll box above the saw cylinder, one of which walls terminates just above the upper rib rail, a roll of cotton in the roll box rotating by action of the saw cylinder, said last mentioned wall of the roll box being substantially offset rearwardly of the upper rib rail for relieving pressure on the roll, an auxiliary comb associated with the lower front wall of the roll box and having teeth extending into the roll in the zone where it is being opened up by the action of the saw cylinder for removing ginned seeds from the roll, and a main seed comb cooperating with the saw cylinder to control the rate of discharge of ginned seeds from the roll.

19. In a cotton gin, a saw cylinder, gin ribs coacting with the saw cylinder to strip the seed from the cotton, an upper rib rail to which the upper ends of the ribs are attached, front and rear walls defining in part a roll box associated with said cylinder, the lower end of the upper rear wall terminating at the upper rib rail, a rearward offset in the last mentioned wall above the upper rib rail forming a recess to effect a sudden relief of surface pressure on the roll in its zone of greatest density to cause ginned seeds therein to move near the surface of the roll, a main seed comb in the lower part of the roll box cooperating with the saws to control the discharge of ginned seeds, and an auxiliary comb mounted adjacent the lower front wall of the roll box above the main seed comb and having teeth penetrating in a radial direction into the roll where it is being broken up by the action of the saw cylinder to separate ginned seeds from the roll.

20. In a cotton gin, a saw cylinder comprising a plurality of spaced saws mounted on a common shaft, gin ribs coacting with the saws to strip the seed from the cotton, an upper rib rail to which the upper ends of the gin ribs are attached, walls defining a roll box into which the saws project, one of said walls terminating just above the upper rib rail, said wall having a sharply defined rearward offset at its juncture with the rib rail and over which the roll in the roll box in its zone of greatest density is forced by the rotation of said saw cylinder.

21. In a cotton gin, a saw cylinder comprising a plurality of spaced saws mounted on a common shaft, gin ribs with which the saws coact, an upper rib rail to which the upper ends of the ribs are attached, walls defining a roll box into which the saws project, a roll of cotton in the roll box, a sharply defined ledge in said wall at the juncture of said wall and the upper rib rail and extending the length thereof parallel to said saw cylinder, said ledge being located to effect a sudden release of pressure in the roll in its zone of greatest density and to cause the ginned seeds to move near the surface of the roll, a main seed comb cooperating with the saws for controlling the discharge of ginned seeds from the gin, and an auxiliary seed comb positioned in advance of the main seed comb in the lower front wall of the roll box and having downwardly curved teeth disposed to penetrate and engage the roll where it is being opened up by the saw cylinder and comb ginned seeds therefrom.

CLARENCE H. TIGNER.